United States Patent Office 3,024,104
Patented Mar. 6, 1962

3,024,104
FERROCHROMIUM ALLOYS
Joseph H. Brennan, Niagara Falls, N.Y., assignor to Union Carbide Corporation, a corporation of New York
No Drawing. Filed Dec. 8, 1959, Ser. No. 858,059
2 Claims. (Cl. 75—126)

The present invention relates to ferrochromium alloys.

It is an object of the present invention to provide a new alloy addition agent for the production of stainless steel and other chromium-containing alloys.

Other objects will be apparent from the subsequent disclosure and appended claims.

Presently existing processes for the manufacture of low-carbon ferrochromium generally involve silicon reduction of chromite in the presence of lime. The silicon employed is in the form of silicon metal, ferrosilicon, or a ferrochrome-silicon alloy. In processes of this type, in order to achieve maximum reduction of chromium, as well as to produce a low-silicon alloy, it is necessary to employ lime in a ratio of between 1.5 and 2.0 parts of lime per part of silica present in the slag. These processes utilize large quantities of lime as a fluxing agent for a silicon oxidizing reaction and thereby produce large volumes of waste slag. The waste slag so produced inevitably entraps some chromium, usually in the order of 5 percent of the slag weight. The resultant chromium loss places a decisive economic penalty on the overall process.

Conventional processes presently practiced for the production of high-carbon ferrochromium involve the direct reduction of chromium ore with carbon, usually in the form of coke. Ferrochromium produced in this manner is invariably contaminated with sulfur. The presence of sulfur, derived from the coke, in the high-carbon ferrochromium alloy is for certain uses particularly objectionable in steels to which ferrochromium is conventionally added as an alloying agent.

A furnacing process has been found for the concurrent production of ferrochromium alloy and a slag high in contained chromium values comprising, smelting chromium ore with an iron-chromium-silicon alloy to reduce a substantial portion of the chromium and iron values contained in the ore to a metallic state to produce ferrochromium alloy and reduce the remainder of the chromium value contained in the ore to chromous oxide which serves to substantially reduce the acidity of the molten slag produced and provide a substantially neutralized high chromium slag suitable for further furnacing to produce additional ferrochromium-containing alloy.

In the broad aspect of the new process, a silicon-bearing ferrochromium alloy is smelted with a quantity of chromium ore having an excess of chromium over that required to react with silicon of the alloy. In the smelting operation a substantial portion of the chromium and iron values contained in the ore is reduced to the metallic state to produce a ferrochromium alloy. The remainder of the chromium and iron values contained in the ore are reduced to chromous oxide and ferrous oxide, respectively. The chromous oxide so produced serves to substantially reduce the acidity of the slag, thereby providing a substantially neutralized high-chromium slag. The slag contains from 20 to 30 percent chromium. The chromous oxide additionally serves to flux the silica derived by the oxidation of the silicon and the silicon-bearing ferrochromium. The 20 to 30 percent chromium slag produced has a higher chromium-to-iron ratio than that of the ore employed. More specifically, there is a selective reduction of iron in this stage which enters the metallic regulus, and the slag contains chromium and iron in the ratio of at least 4 to 1, whereas most chromium ores will contain chromium-to-iron in a ratio between about 1.5 and 4.0 to 1.

The high chromium-to-iron ratio of the slag is obtained regardless of the chromium ore used in the initial smelting operation and this high ratio enables the use of the slag in further smelting operations to produce ferrochromium or other iron-chromium alloys, such as, iron-chromium-silicon alloy, having a higher chromium-to-iron ratio than is possible by the direct smelting of chromium ores. In carrying out the process of the present invention, it has been found that any chromium ore having a chromium-to-iron ratio from between about 1.5 to 1 and 4 to 1 is suitable for use in this invention.

As previously stated, in the prior silicon reduction processes for the production of ferrochromium alloys, lime was employed as a fluxing agent. The silica slag produced by the oxidation of silicon to silica required the use of lime in a ratio of 1.5 to 2 parts of lime per part of silica present in the final slag. In the new process chromium ore and an iron-chromium-silicon alloy may be smelted together to produce a ferrochromium alloy of the low-carbon grade, if the silicon in the iron-chromium-silicon alloy is so proportioned to the chromium ore as to reduce a substantial portion of the iron and chromium contained in the ore to a metallic state and reduce the remainder of the chromium contained in the ore to chromous oxide such as to leave a slag containing 20 to 30 percent chromium. The stoichiometric requirements of silicon needed for such reduction may be calculated from the iron and chromium contents of the chromium ore and the predicted slag weight and composition. Under these conditions the chromous oxide represented by the 20 to 30 percent chromium in the slag acts as an effective base to neutralize the silica formed by the oxidation of the silicon reducing agent.

The high chromium slag concurrently produced with the ferrochromium alloy may be resmelted with a carbonaceous reducing agent and silica to produce an iron-chromium-silicon alloy. The high chromium slag will act as a source of both chromium and silica; however, it has been found necessary to employ additional quantities of silica. The quantity of silica to be added will be dependent upon the desired silicon content of the iron-chromium-silicon alloy to be produced in the resmelting operation, which, in turn, depends on the desired carbon content of the ferrochromium alloy to be produced from iron-chromium-silicon alloy.

In carrying out the process for the production of low-carbon ferrochromium at approximately 0.1 percent carbon level or less, a subsequent resmelting of the high-chromium slag with silica and a carbonaceous reducing agent, produces a surplus of ferrochromium-silicon that has a silicon content of 40 to 50 percent. The surplus ferrochromium-silicon produced can be marketed as a ferrochromium-silicon alloy, the remainder may be recycled for use in the production of low-carbon ferrochromium alloys.

In the known art of producing ferrochromium of the low-carbon types, by the silicon reduction of chromium ore, wherein lime is employed as a flux, it has been usual to carry out such smelting operations in furnaces lined with magnesia refractory. The instant process is preferably carried out in furnaces lined with chromium ore. When a chromium lined furnace is used, the resultant slag is not further contaminated by any of the refractory material that is consumed during smelting operations. This procedure also has a definite economic advantage in that such wastage and use of refractory that occur during smelting operation results in the chromium ore refractory becoming part of the resultant slag which is recycled to the first smelting step where the chromium ore content is recovered. This process, therefore, also has the advantages of minimizing refractory costs, improving chromium recovery and minimizing slag contamination.

Following the above-described process, chromium ore is smelted in a chromium ore lined furnace with an iron-chromium-silicon alloy. In the smelting operation, a substantial portion of chromium and iron values contained in the ore are reduced to a metallic state to produce a ferrochromium alloy. The carbon content of the alloy produced will be dependent upon the silicon content of iron-chromium-silicon alloy. In producing ferrochromium of less than 0.5 percent carbon an iron-chromium-silicon alloy containing 30 to 50 percent silicon may be employed. For ferrochromium of 0.5 percent to 5 percent carbon an iron-chromium-silicon alloy of 15 to 30 percent silicon may be used and, for ferrochromium containing in excess of 4 percent carbon, the iron-chromium-silicon alloy may contain 2 to 15 percent silicon. The remainder of the chromium and iron values contained in the ore are reduced to chromous oxide and ferrous oxide, respectively. The chromous oxide so produced served to substantially reduce the acidity of the molten slag and provide a substantially neutralized high-chromium slag. The high chromium-to-iron ratio of the slag is obtained regardless of the chromium ore used in the initial smelting operation and this high ratio enables the use of the slag in further smelting operations to produce ferrochromium or other iron-chromium alloys, such as iron-chromium-silicon alloy, having a higher chromium-to-iron ratio than is possible by direct smelting of chromium ore.

The objects of the invention are achieved by practicing the aforementioned process, with due consideration for proper stoichiometric proportions, to produce a ferrochromium alloy consisting of from about 48 up to about 55 weight percent chromium, about 3.3 up to about 4.5 weight percent carbon, up to about 2 weight percent of silicon, the balance being iron and incidental impurities. In addition to the composition, the ferrochromium is characterized by sufficiently high magnetic susceptibility to make it amenable to magnetic handling.

The most satisfactory composition within the scope of the present invention consists of from about 50 to about 52 weight percent of chromium, about 4 weight percent of carbon, from about 1.4 to about 1.5 weight percent silicon, and the balance iron and incidental impurities.

In an example of the production of the ferrochromium of the present invention, an iron-chromium-silicon alloy was first prepared. In the preparation, each batch was made by mixing 1000 pounds of Transvaal B chrome ore sized to 4-inches x ¾ inch (having the typical composition shown in Table I), 65 pounds of dolomite (having a typical calcium oxide-plus-magnesium oxide content of 58.6 weight percent), 65 pounds of Pocahontas coal (having a typical fixed carbon of 72.0 weight percent), 265 pounds of regular pea coke (having a typical fixed carbon of 74.0 weight percent), 150 pounds of wood chips (having a typical fixed carbon of 14.0 weight percent), and 305 pounds of Killarney quartzite (having the typical composition shown in Table II).

TABLE I

*Composition of Transvaal B Ore*

| | Weight percent |
|---|---|
| $Cr_2O_3$ | 44.2 |
| FeO | 24.2 |
| $SiO_2$ | 3.4 |
| $Al_2O_3$ | 14.4 |
| MgO+CaO | 11.7 |
| Free C | 0.15 |
| Cr/Fe | 1.61 |
| $(MgO+CaO)/Al_2O_3$ | 0.81 |
| Loss on ignition (1000° C. for 1 hour) | Nil |

TABLE II

*Composition of Killarney Quartzite*

| | Weight percent |
|---|---|
| CaO+MgO | 0.2 |
| $Al_2O_3$ | 0.9 |
| Fe | 0.6 |
| $SiO_2$ | 97.6 |

Each batch was smelted for about 2 hours in a 3-phase, 60-cycle, submerged arc electric furnace operated at 75 to 150 volts with a power output of approximately 9500 kilowatts. In each batch, an iron-chromium-silicon alloy and a throw-away slag were obtained. The average composition of the iron-chromium-silicon alloy for 5,613 batches was 50.08 weight percent Cr, 11.74 weight percent Si, 4.52 weight percent C, the balance being iron and incidental impurities. The total chromium accounted for was 99 percent.

The slag produced concurrently with the iron-chromium-silicon alloy had an average composition of 2.09 weight percent Cr, 24.61 weight percent MgO, 7.08 weight percent CaO, 27.05 weight percent $Al_2O_3$, and 40.88 weight percent $SiO_2$.

The iron-chromium-silicon alloy (1680 pounds) together with remelt material (combined slag and alloy which solidified before recovery) (658 pounds) were mixed with Transvaal B chrome ore (1600 pounds) and smelted together in a 3-phase, 60 cycle submerged arc furnace at 250 volts with a power input of 8500 kilowatts per hour. The Transvaal B chrome ore had a typical analysis shown in Table III.

TABLE III

*Composition of Transvaal B Chrome Ore*

| | Weight percent |
|---|---|
| $Cr_2O_3$ | 44.51 |
| FeO | 24.15 |
| $SiO_2$ | 3.81 |
| $Al_2O_3$ | 14.60 |
| MgO+CaO | 11.80 |
| Cr/Fe | 1.61 |
| $MgO/Al_2O_3$ | 0.81 |
| Loss on ignition | Nil |

After 5 hours the first tap was made and additional taps were made at 2 hour intervals thereafter into refractory brick-lined ladles. After 4,734 such batches, the alloy of the present invention so produced had an average clean metal analysis of 1.66 weight percent Si, 52.78 weight percent Cr, 40.23 weight percent Fe, 4.35 weight percent C, and 0.98 incidental impurities.

The slag produced concurrently had an average analysis of 25.04 weight percent total Cr (22.97 weight percent $Cr_2O_3$), 26.01 weight percent $SiO_2$, 15.34 weight percent AlO and 13.41 combined calcium oxide and magnesium oxide. This slag may be smelted with coke and silicon for the further production of the iron-chromium-silicon alloy by the methods described previously, if desired.

The incidental impurities present in the alloy of the present invention are primarily of four types: (1) silicates, (2) ilumenite associated with titanium nitride and/or carbide, (3) chromium sulfides, and (4) entrapped slag (in order of decreasing importance). The ilumenite apparently comes from the titanium contained in the Transvaal chrome ore.

The product of the present invention has, in addition to high cleanliness, a higher density than the other ferrochromium materials generally employed as addition agents.

In order to further characterize the product of the present invention, melting point determinations are made and compared to those for standard addition agents. The data are shown in Table IV.

TABLE IV

|  | Product of invention | Charge chromium | High-carbon ferro-chromium |
|---|---|---|---|
| Composition: | | | |
| Cr_____percent__ | 51.0 | 54.04 | 68.52 |
| C_____do____ | 4.0 | 6.14 | 4.39 |
| Si_____do____ | 1.42 | 5.34 | 1.52 |
| Fe_____do____ | Balance | Balance | Balance |
| Solidus temperature____°C__ | 1,270±15 | 1,200±15 | 1,335±15 |
| Liquidus temperature___°C__ | (¹) | 1,520±15 | 1,460±15 |

¹ Not detected.

The term "Not detected" as it appears in Table IV above means that the solidus and liquidus temperatures were so nearly identical that the difference between them could not be detected.

One of the outstanding properties of the product of the present invention is its magnetic susceptibility. Table V shows data comprising the magnetic susceptibility of the product at several silicon levels compared to several other materials. The magnetic susceptibility data were obtained on a balance scale having an electromagnet operating at a fixed current of 0.2 ampere mounted on one side. The weight in grams which must be added to the other side of the balance in order to break the electromagnet away from the surface of a standard sized specimen of the material in question is termed herein as its magnetic susceptibility.

TABLE V

Material:         Magnetic susceptibility in grams
Plain carbon, cold-rolled steel_____ 500+
Product of present invention containing 50 to 52% chromium, about 4% carbon and a silicon content of:
   0.75% _____ 400
   1.46% _____ 470
   1.90% _____ 500+
High-carbon ferrochrome (68.35 Cr, 4.39 C, 1.52 Si) _____ 0.85
Low-chromium, high-carbon ferrochromium (60.43 Cr, 4.23 C, 1.63 Si) _____ 29.0
Regular Charge Chromium (54.04% Cr, 6.14% C, 5.35% Si, 0.0245%) _____ 33.0

Table VI shows data illustrating the magnetic properties of the present invention for various chromium and carbon levels. Magnetic susceptibilities were obtained in the same manner as described above.

TABLE VI

| Composition, weight percent | | | | Magnetic susceptibility, grams |
|---|---|---|---|---|
| Cr | C | Si | Fe | |
| 48.70 | 3.77 | 1.81 | Balance_____ | 500++ |
| 48.70 | 4.15 | 1.76 | _____do_____ | 400 |
| 49.03 | 3.3 | 0.99 | _____do_____ | 500+ |
| 50.48 | 3.67 | 0.97 | _____do_____ | 500+ |
| 50.65 | 4.07 | 1.22 | _____do_____ | 500+ |
| 54.47 | 4.24 | 1.14 | _____do_____ | 500+ |

Thus it may be seen that the product of the present invention may be readily handled by magnetic means, a property of great value in industrial use.

This application is a continuation-in-part of United States Serial No. 777,230, filed December 1, 1958, which is a continuation-in-part of United States Serial No. 700,071, filed December 2, 1957. Both previous applications are abandoned.

What is claimed is:

1. As a new composition of matter a ferrochromium alloy consisting of from about 48 up to about 55 weight percent chromium, about 3.3 up to about 4.5 weight percent carbon, from about 0.75 up to about 2 weight percent of silicon, the balance being iron and incidental impurities, said alloy being characterized by high magnetic susceptibility.

2. An alloy in accordance with claim 1 wherein said chromium is in the range of from 50 to 52 percent, said carbon is about 4 percent, and said silicon is in the range of about 1.4 to 1.5 percent.

References Cited in the file of this patent

Adcock: Journal of the Iron & Steel Institute, vol. 124, 1931, No. II, pages 99–149 (page 110 relied on), published by the Iron and Steel Institute, London, England.

Westgren et al.: Journal of the Iron & Steel Institute, vol. 117, 1928, No. I, pages 383–400 (pages 389 and 400 relied on), published by the Iron and Steel Institute, London, England.